United States Patent [19]

Alessio et al.

[11] 3,710,441
[45] Jan. 16, 1973

[54] NUMERICALLY CONTROLLED AUTOMATIC WIRING SYSTEM

[75] Inventors: Sergio A. Alessio, Elmhurst; Weichien Chow, Park Forrest, both of Ill.

[73] Assignee: The Bunker-Ramo Corporation, Oak Brook, Ill.

[22] Filed: May 15, 1970

[21] Appl. No.: 37,503

[52] U.S. Cl. .......................29/624, 29/604, 29/433
[51] Int. Cl. .........................H01b 13/00, H05k 3/00
[58] Field of Search.........................29/624, 604, 433

[56] References Cited

UNITED STATES PATENTS

| | | | |
|---|---|---|---|
| 3,377,699 | 4/1968 | Dinella | 29/604 |
| 3,391,398 | 7/1968 | Matsushita | 29/604 |
| 3,435,518 | 4/1969 | Denes | 29/433 |
| 3,436,813 | 4/1969 | Wells et al. | 29/604 |
| 3,439,087 | 4/1969 | Ledeen | 29/604 |
| 3,460,245 | 8/1969 | Hazel et al. | 29/433 |
| 3,543,397 | 12/1970 | Hoagland | 29/433 |

Primary Examiner—John F. Campbell
Assistant Examiner—Donald P. Rooney
Attorney—Frederick M. Arbuckle

[57] ABSTRACT

A compact, multi-branch, plug-in interconnection module of either two-dimensional or three-dimensional form providing a desired interconnection pattern and having a total effective length related to the sum of the lengths of the individual branches. The interconnection module is fabricated by initially supporting the module terminals in a threading fixture disposed below a threading head which supplies a continuous insulated wire. The fixture is driven in x–y directions by a numerical control positioning apparatus so as to cause the wire from the threading head to thread selected terminals along predetermined paths in a predetermined sequence. After threading, the wires are electrically affixed to the respective terminals to which they were threaded. The resulting structure is then removed from the threading fixture and subjected to a cutting operation which provides for the cutting of wires in all paths except predetermined assigned "threading paths". The program of the numerical control apparatus is chosen in conjunction with the assignment of the "threading paths" so that the cutting operation results in eliminating all terminal interconnections except those desired in the completed interconnection module. After the cutting operation, the structure is bent into a desired two or three-dimensional shape and then encapsulated leaving its plug-in terminals exposed.

10 Claims, 6 Drawing Figures

INVENTORS
WEICHIEN CHOW
SERGIO A. ALESSIO
BY
Nathan Cass
ATTORNEY

PATENTED JAN 16 1973

INVENTORS
WEICHIEN CHOW
SERGIO A. ALESSIO
BY Nathan Cass
ATTORNEY

3,710,441

NUMERICALLY CONTROLLED AUTOMATIC WIRING SYSTEM

CROSS-REFERENCES TO RELATED PATENT APPLICATIONS

This patent application is directed to subject matter similar to that disclosed in the commonly assigned copending patent application Ser. No. 875,906, filed Oct. 12, 1969, for Automated Wiring System and Method, Weichien Chow, inventor, which in turn is a continuation in part of patent application, Ser. No. 854,413, filed Sept. 2, 1969, for Automated Wiring System and Method, now abandoned.

BACKGROUND OF THE INVENTION

It will be recognized that the manner in which electronic circuitry is interconnected and packaged is a very important factor in the design and construction of electrical apparatus and devices. The aforementioned patent applications disclose a packaging and interconnection technique which constitutes a very significant step forward in this regard.

Briefly, in an exemplary embodiment disclosed in the aforementioned patent applications, one or more specially constructed interconnection modules are plugged into a printed circuit board to provide desired electrical interconnections between components thereon. Each interconnection module is typically fabricated using a computer-controlled winding means for forming wire loops on an elongated interconnection module core from a continuous wire in a manner so that loops are caused to engage predetermined slot locations of the core in a predetermined sequence. Terminals are then provided in the slots and the wire loops electrically affixed thereto, such as by the use of dip-soldering, infrared bonding or conductive epoxy. The wire loop portions on one side of the core are next removed, such as by cutting or otherwise separating the wires at predetermined locations, whereby the interconnections provided by the remaining loop portions provide the interconnection pattern desired for the completed interconnection module. The resulting structure is then encapsulated leaving appropriate terminal portions exposed to serve as plug-in terminals.

OBJECTS AND SUMMARY OF THE PRESENT INVENTION

The above described interconnection approach of the aforementioned patent application has the characteristic that the overall length of the interconnection module is dependent on the number of interconnection and/or output terminals required. Accordingly, where a large number of output terminals and/or interconnections are required, the module may reach an uneconomical length. For example, a required length of the interconnection module of greater than twelve inches may be uneconomical in certain applications.

It is thus the primary object of the present invention to provide an improved construction and fabrication method for an interconnection module which retains the advantages disclosed in the aforementioned patent application, while overcoming the above described length characteristic thereof.

Another object of the present invention is to provide an improved, low-cost plug-in type of interconnection module for use with printed and integrated circuit boards, modules, harness assemblies, and the like, which may be of three-dimensional as well as two-dimensional form.

A further object of the present invention is to provide an improved method of making a compact interconnection module having a large number of terminals.

Still another object of the present invention is to provide an improved method of making an interconnection module which is economical and capable of being automated to a high degree.

Yet another object of the invention is to provide a method of making a compact interconnection module of desired two-dimensional or three-dimensional form.

Briefly, the above objects are accomplished in a typical embodiment of the invention by the provision of a plug-in type of multi-branch interconnection module having a total effective length related to the sum of the lengths of the individual branches. The interconnection module of the invention is typically fabricated using a technique in which the terminals of the module are initially supported in a threading fixture which, in turn, is driven in an x-y direction by a numerical control positioning apparatus programmed in accordance with the terminal interconnection pattern desired for the completed module. A fixed threading head is mounted above the threading fixture and supplies a continuous wire, whereby x-y movement of the threading fixture in response to the numerical control apparatus causes selected terminals to be threaded along predetermined paths and in a predetermined sequence. After the threading operation, the wires are electrically affixed to the respective terminals to which they have been threaded, following which the resulting interconnected terminal structure is removed from the threading fixture, and the interconnecting wires cut in a manner which results in eliminating undesired terminal interconnections, while retaining desired terminal interconnections. The resulting structure is then suitably encapsulated, leaving appropriate terminal portions exposed to serve as plug-in terminals for the completed interconnection module. The interconnected terminal structure can be bent and shaped prior to encapsulation so as to permit obtaining an appropriately shaped interconnection module of three-dimensional form as well as of two-dimensional form.

The specific nature of the invention, as well as other objects, uses and advantages thereof, will become clearly evident from the following detailed description of a typical embodiment taken in conjunction with the accompanying drawings in which.

Like numerals refer to like elements throughout the figures of the drawings.

Figure 1:
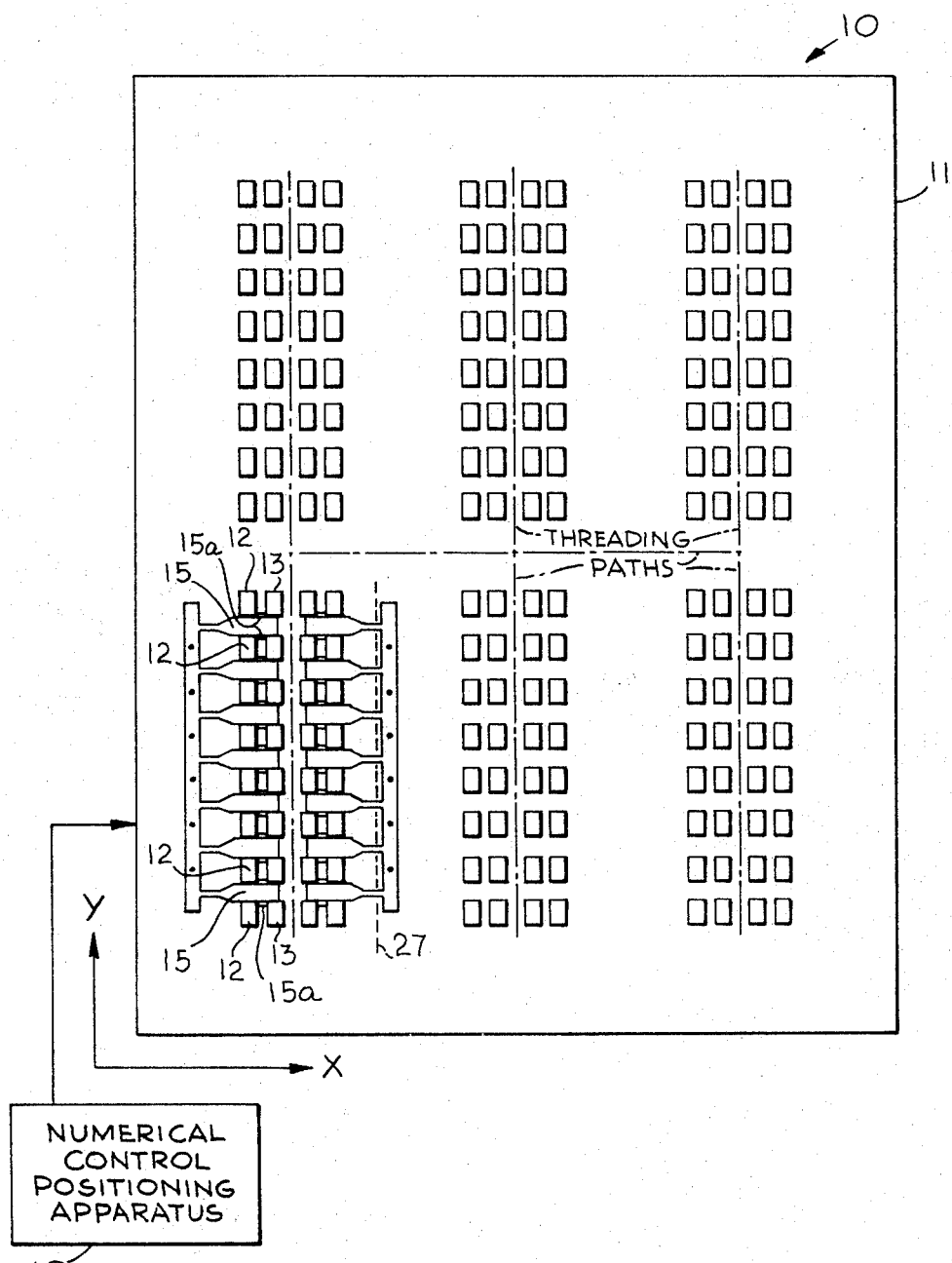
FIG. 1 is a plan view of an exemplary threading fixture for holding terminals in place during a numerically controlled threading operation.
Figure 2:
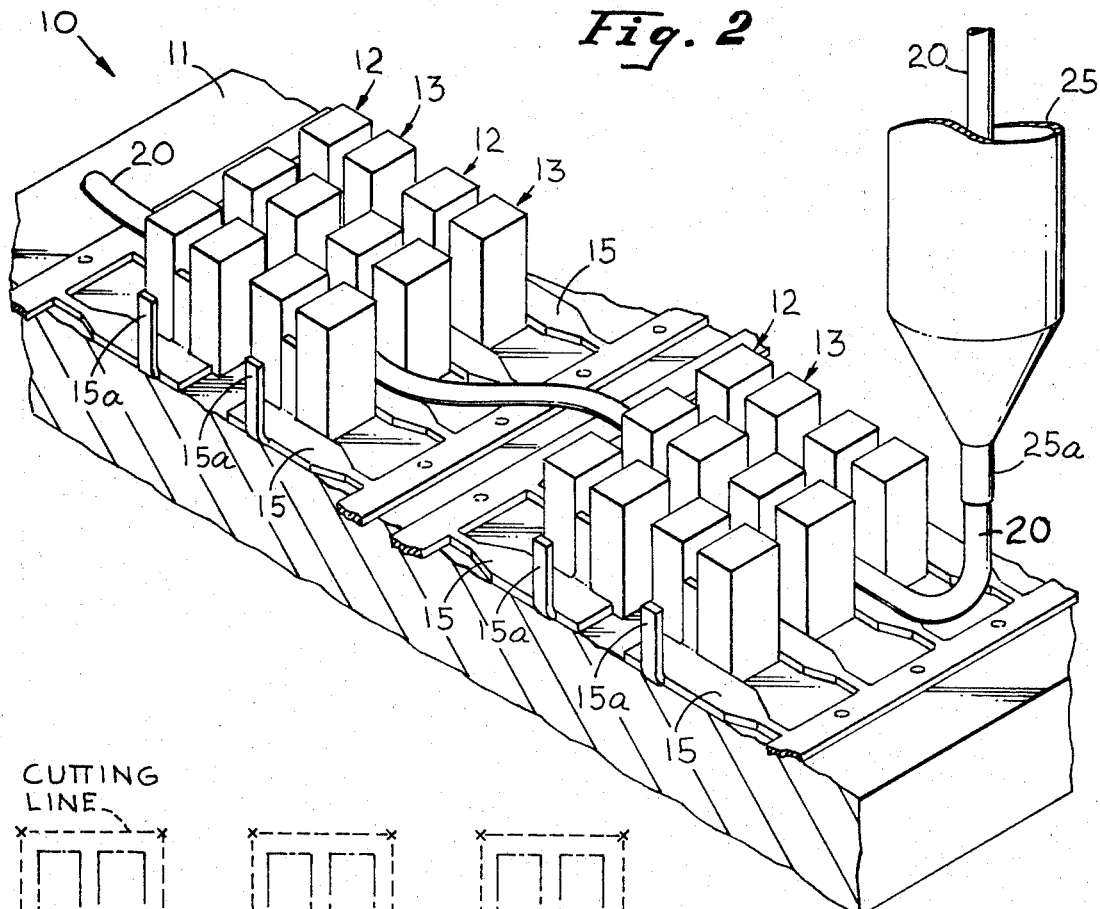
FIG. 2 is an enlarged fragmentary perspective view of FIG. 1 illustrating details thereof, and showing a wire being threaded between selected terminals as a result of x-y movement of the threading fixture.

Referring initially to FIGS. 1 and 2, illustrated therein is a typical threading fixture 10 having a base 11 and perpendicularly projecting plugs 12 and 13 for holding banks of electrical terminals 15 during a threading operation. For greater clarity, the spacings between the various groups of plugs in FIG. 1 have been exaggerated and terminals are shown residing in only the lower-left group of plugs.

The base 11 of the fixture 10 may typically be of aluminum, while the threading plugs 12 and 13 may typically be nylon plugs plugged into suitable receiving holes (not shown) in the base 11. The dimensions of the base 11 may, for example, be 8 × 10 × ½ inches, and each plug 12 or 13 may, for example, have dimensions of 0.3 × 0.1 × 0.05 inch.

As best seen in FIG. 2, each terminal 15 is provided with spaced, perpendicularly depending crimping members 15a which are used after completion of the threading operation to secure any wires which have been threaded thereto. As also best seen from FIG. 2, the terminals 15 are held in respective spaces (for example, 0.1 inch) between adjacent like-numbered plugs 12—12 or 13—13 with their crimping members 15a being seated in smaller spacings (for example, 0.04 inch) provided between each pair of plugs 12-13.

It will be seen from FIG. 2 that the threading head 25 has a wire feeding end 25a for supplying a continuous insulated wire 20 to the threading fixture 10. The location of the wire feeding end 25a of the threading head 25 with respect to the plugs 12, 13 and the force required to pull out the wire 20 therefrom are chosen so that, during the threading operation, the wire 20 is spewed out to interconnect predetermined ones of the terminals 15 along predetermined paths in correspondence with the x-y movement of the fixture 10 dictated by the numerical control apparatus 18.

Figure 3:
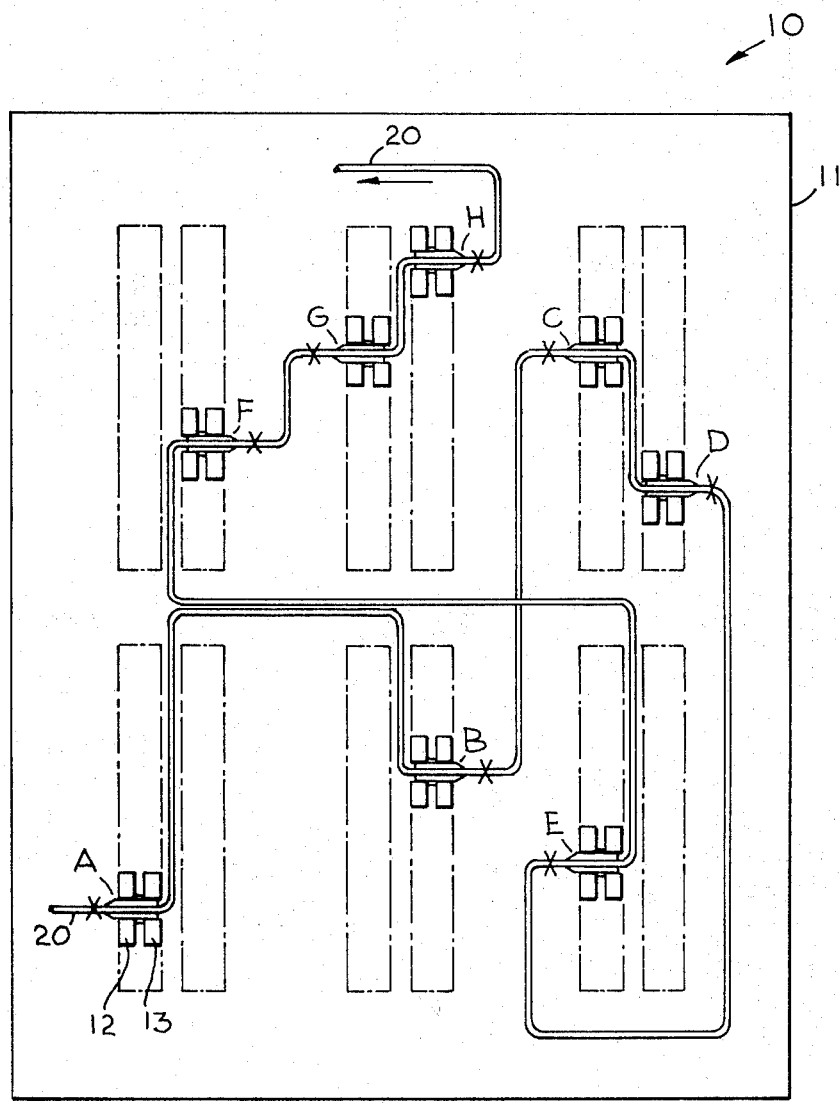
FIG. 3 is a plan view of the type shown in FIG. 1 which will be used to explain how wire paths are chosen during the threading operation so that the completed interconnection module will provide the desired terminal interconnections.

Reference is now additionally directed to the exemplary threading arrangement illustrated in FIG. 3 for use in explaining how the paths traversed by the wire 20 during a threading operation are chosen in order to provide the terminal interconnections desired for the completed interconnection module. For simplicity and clarity, only the particular plugs 12 and 13 of the fixture 10 are shown which hold the terminals that are threaded by the wire 20 in the exemplary threading arrangement illustrated, these particular terminals being designated by the letters A, B, C, D, E, F and G for identification purposes. Also, it will be understood that the exemplary threading arrangement illustrated in FIG. 3 normally constitutes only a relatively small portion of a completed threading arrangement which typically may have many overlapping wire paths with many wires in each path and with one or more wires threading each terminal. In addition, it will be assumed in connection with the exemplary threading arrangement of FIG. 3 that the completed interconnection module requires interconnections only between the pairs of terminals A and B, C and D, E and F, and G and H.

The illustrative threading arrangement shown in FIG. 3 for the continuous wire 20 will be seen to begin at the lower left group of plugs 12, 13 holding terminal A, and from there progresses to sequentially thread the plugs 12, 13 corresponding to terminals B, C, D, E, F, G and H via the particular paths shown. Although all of the terminals A to H are thus interconnected by the same wire 20, the present invention nevertheless permits the desired terminal interconnections to be obtained for the completed module. This is achieved as a result of having assigned certain "threading paths" to the fixture 10, such as, for example, the ꟷꟷꟷ threading paths illustrated in FIG. 1. Wires contained in these "threading paths" are retained during subsequent fabrication operations performed on the module, while wires in all other possible paths are cut. Thus, as the wire 20 proceeds from terminal to terminal during the threading operation, terminals which are to be electrically interconnected in the completed module are interconnected via one or more "threading paths", while terminals which are not to be electrically connected are interconnected via at least one path which is not a threading path. Accordingly, the pairs of terminals A and B, C and D, E and F, and G and H between which electrical connections are desired are each interconnected only via one or more of the "threading paths" illustrated in FIG. 1, while each of the pairs of terminals B-C, D-E and F-G are interconnected via at least one path which is not a "threading path". Obviously, the invention is not limited to the particular exemplary "threading paths" illustrated in FIG. 1.

After the threading operation is completed, the crimping members 15a of the terminals 15 (FIGS. 1 and 2) are crimped to secure the wires to the respective terminals to which they were threaded. This can be accomplished for each terminal individually or, preferably, by the use of a suitable crimping fixture (not shown) which is applied over the threading fixture 10 for performing the crimping operation on all terminals simultaneously. The wires are then soldered to their respective terminals, such as by the use of infrared soldering or other suitable means.

Figure 4:
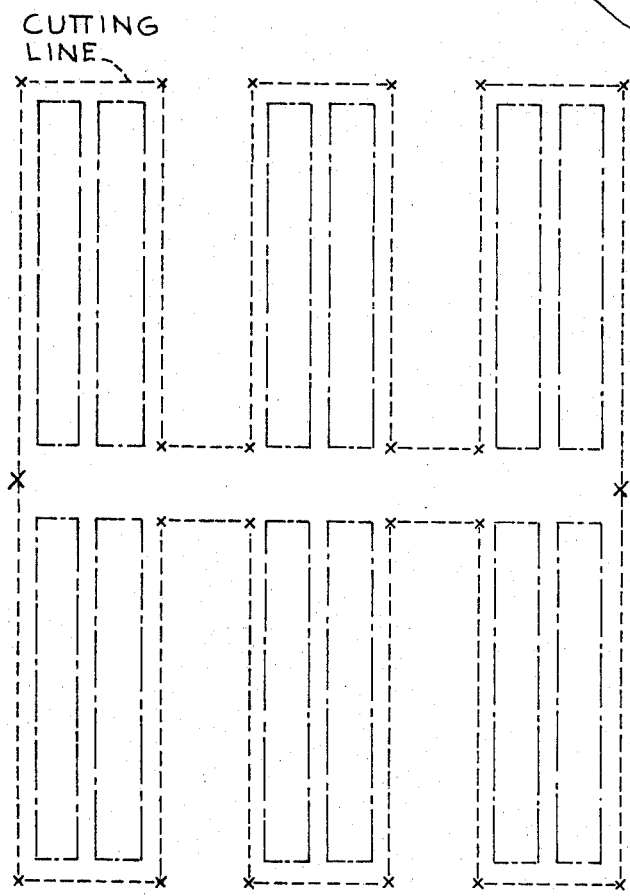
FIG. 4 is a schematic plan view illustrating how the threaded terminal interconnection structure obtained after threading, soldering, and removal from the threading fixture may typically be cut along predetermined lines to eliminate undesired terminal interconnections, while retaining desired terminal interconnections.

The next step in the fabrication of the interconnection module is to remove the resulting soldered interconnected terminal structure from the threading fixture, and to then cut the wires in all interconnection paths except the "threading paths" illustrated in FIG. 1. A typical manner in which this cutting may be accomplished is illustrated in FIG. 4 by the x cutting lines indicated therein, which results in a multi-branch interconnected-terminal structure having the form of an ꟷꟷꟷ corresponding to that of the "threading paths" of FIG. 1. While the cutting of these wires could, of course, be done in a plurality of steps, it is preferred that this cutting be done simuleaneously, such as, for example, by the application to the structure of a cutting fixture (not shown) having cutting edges corresponding to the x cutting lines indicated in FIG. 4.

Figure 5:
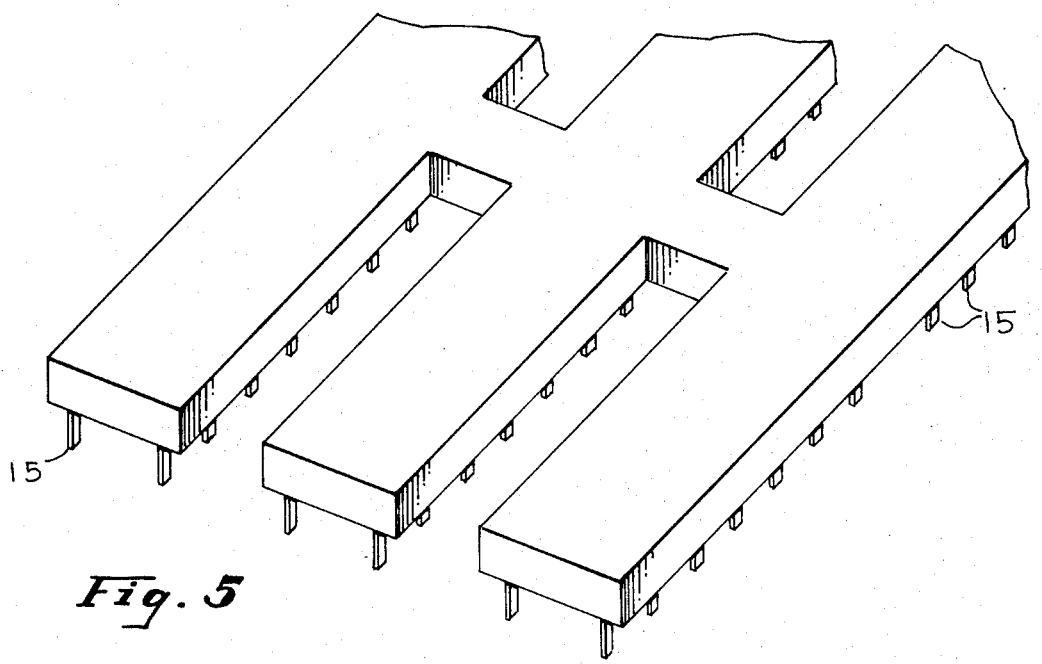
FIGS. 5 and 6 are perspective views illustrating two possible shapes that can be provided for the completed interconnection module.

The final steps in the fabrication of the interconnection module involve bending the terminals to the final positions desired for the completed interconnection module, then electrically isolating the individual terminals, such as by cutting each terminal bank along the dashed line 27 in FIG. 1, and then suitably encapsulating the entire interconnected terminal structure to provide the resulting interconnection module typically illustrated in FIG. 5 which typically may have overall dimensions of 3 × 3 × ½ inches.

Figure 6:
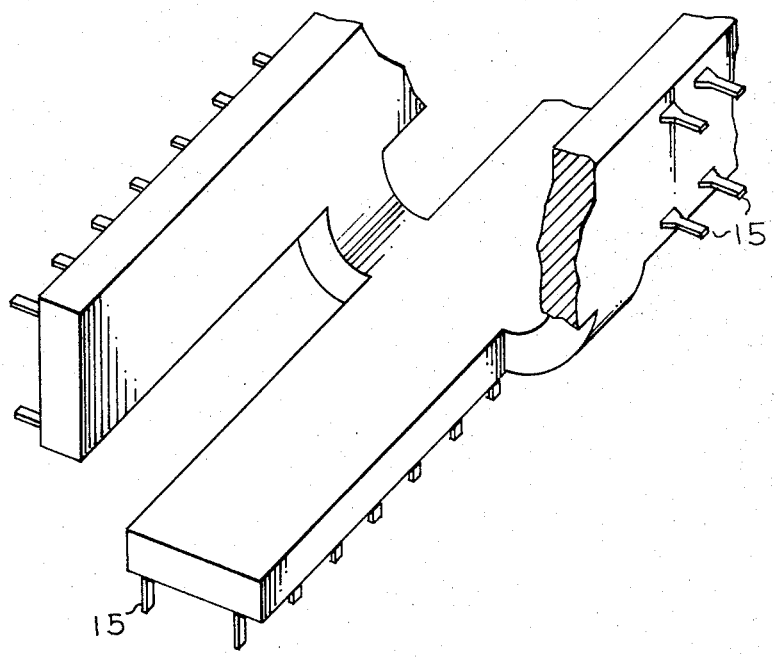

It will be understood that, since the interconnected terminal structure is capable of being bent in various ways prior to encapsulation, a wide variety of shapes of either two-dimensional or three-dimensional form may be provided for the completed interconnection module. FIG. 6 illustrates a particular three-dimensional shape which may be provided for the completed interconnection module by bending each of the outer legs of the structure outwardly by an angle of 90° prior to encapsulation.

The interconnection module in accordance with the invention may be used for a wide variety of purposes, such as a plug-in module for a printed circuit board for interconnecting integrated circuit modules and/or other components or connectors provided thereon, and/or may also be used with a mother board for interconnecting other printed circuit boards. Also, a module in accordance with the invention may be adapted for soldering to a printed circuit board, or the module terminals could be employed as the contacts of a connector. The interconnection module of the invention may additionally be adapted so as to be capable of being plugged into the connector terminals of a harness assembly for providing desired interconnections between the wires of the harness. The above examples of possible uses are obviously not exhaustive, and various other uses will, no doubt, occur to those skilled in the art.

Although the present invention has been described in connection with particular exemplary embodiments thereof, it is to be understood that the invention is subject to many modifications in construction, arrangement, method of fabrication and use without departing from the scope of the invention as defined in the appended claims.

The embodiments of the invention in which an exclusive property or privilege is claimed are defined as follows:

1. In a method of providing a desired terminal interconnection pattern, the steps of:
    providing terminal supporting means having terminals disposed at predetermined locations thereof,
    automatically threading selected terminals with a continuous wire in a predetermined order and following selected paths such that those terminals which are to be electrically connected are interconnected only via predetermined threading paths while those terminals which are not to be electrically connected are interconnected via at least one path which is not one of said predetermined threading paths, and
    cutting the threaded wires in all but said predetermined threading paths so as to thereby provide the desired terminal interconnection pattern for said module.

2. The invention in accordance with claim 1, wherein said method includes affixing the threaded wires to the respective terminals to which they are threaded prior to said cutting.

3. The invention in accordance with claim 2, wherein said method includes removing from said supporting means the resulting terminal and threaded wire structure obtained after said cutting and then encapsulating the structure leaving at least predetermined ones of said terminals exposed.

4. The invention in accordance with claim 3, wherein said method includes bending said structure into a desired shape prior to encapsulation.

5. In a method of making an interconnection module having a desired terminal interconnection pattern, the steps of:
    supporting module terminals at predetermined locations of a supporting means disposed adjacent a threading head which supplies a continuous wire,
    relatively moving said supporting means and said threading head under the control of a numerical control apparatus so as to thread selected terminals in a manner such that those terminals which are to be electrically connected in said module are interconnected only via predetermined threading paths while those terminals which are not to be electrically connected are interconnected via at least one path which is not one of said predetermined threading paths,
    affixing the threaded wires to the respective terminals to which they are threaded, and
    cutting the threaded wires along predetermined cutting lines so that wires in all but said predetermined threading paths are cut so as to thereby provide the desired terminal interconnection pattern for said module.

6. In a method of fabricating an electrical circuit module having a plurality of output terminals electrically interconnected in a predetermined electrical interconnection pattern, the steps of:
    disposing a wire threading head adjacent a threading fixture having a plurality of threading members at locations corresponding to said output terminals,
    automatically moving said head and said fixture relative to one another so that said members are threaded by a continuous wire supplied by said head in an order and along paths in accordance with a predetermined program so as to produce a threaded wire structure containing both desired and undesired electrical connections,
    said predetermined program being chosen in accordance with the interconnection pattern desired for said module so that those members corresponding to terminals between which electrical connections are desired are threaded via first predetermined paths while those members corresponding to terminals between which electrical connections are not desired are threaded via second predetermined paths different from said first predetermined paths, and
    cutting said threaded structure along paths intersecting said second predetermined paths so that wires located in said second predetermined paths are cut while wires located in said first predetermined paths are retained, thereby providing a resulting electrical interconnection pattern for said threaded structure conforming to that desired for said module.

7. The invention in accordance with claim 6, wherein said method includes affixing terminals to said threaded structure at locations thereof corresponding to the locations of said threading members.

8. The invention in accordance with claim 7, wherein said method includes removing said threaded structure from said fixture and bending said structure into a desired shape.

9. The invention in accordance with claim 7, wherein said terminals are initially disposed in said threading members of said fixture prior to the formation of said threaded structure during the step of automatically moving.

10. The invention in accordance with claim 7, wherein said fixture has a planar surface from which said threading members depend, and wherein the relative movement of said head and fixture during the step of automatically moving occurs in directions parallel to said planar surface.

* * * * *